United States Patent
Hiura et al.

(10) Patent No.: US 10,128,731 B2
(45) Date of Patent: Nov. 13, 2018

(54) LINEAR VERNIER MOTOR

(75) Inventors: Ryota Hiura, Tokyo (JP); Katsuhiro Hirata, Osaka (JP); Hiroshi Ishiguro, Osaka (JP); Yoshihiro Nakata, Osaka (JP)

(73) Assignees: MITSUBISHI HEAVY INDUSTRIES, LTD., Osaka (JP); OSAKA UNIVERSITY, Osaka (JP)

( * ) Notice: Subject to any disclaimer, the term of this patent is extended or adjusted under 35 U.S.C. 154(b) by 1066 days.

(21) Appl. No.: 14/113,428

(22) PCT Filed: May 16, 2012

(86) PCT No.: PCT/JP2012/062480
§ 371 (c)(1),
(2), (4) Date: Oct. 23, 2013

(87) PCT Pub. No.: WO2012/157664
PCT Pub. Date: Nov. 22, 2012

(65) Prior Publication Data
US 2014/0042833 A1 Feb. 13, 2014

(30) Foreign Application Priority Data

May 17, 2011 (JP) .................... 2011-110519

(51) Int. Cl.
*H02K 41/03* (2006.01)
*H02K 1/27* (2006.01)
*H02K 41/02* (2006.01)

(52) U.S. Cl.
CPC ........... *H02K 41/02* (2013.01); *H02K 41/031* (2013.01); *H02K 1/278* (2013.01); *H02K 2213/03* (2013.01)

(58) Field of Classification Search
CPC ...... H02K 41/02; H02K 1/278; H02K 41/031; H02K 2213/03; H02K 1/148
(Continued)

(56) References Cited

U.S. PATENT DOCUMENTS 4,895,505 A * 1/1990 Inaba ..................... B29C 45/17
264/40.5
4,908,533 A * 3/1990 Karita .................... H02K 41/03
310/12.18
(Continued)

FOREIGN PATENT DOCUMENTS

CN 101009454 8/2007
EP 0 280 743 9/1988
(Continued)

OTHER PUBLICATIONS

Decision to Grant a Patent dated Apr. 26, 2016 in corresponding Chinese Application No. 201280021328.0, with English translation.
(Continued)

*Primary Examiner* — Bernard Rojas
*Assistant Examiner* — Maged Almawri
(74) *Attorney, Agent, or Firm* — Wenderoth, Lind & Ponack, L.L.P.

(57) ABSTRACT

A linear vernier motor includes a stator and a mover. The stator extends in a first direction. The mover extends in the first direction and a pole interval is different from that of the stator. At least one of the stator and the mover includes: a plurality of permanent magnets arranged in the first direction and a plurality of yokes arranged in the first direction. Each of the plurality of yokes is arranged between adjacent permanent magnets. The plurality of permanent magnets is magnetized to the first direction and magnetization orientations of adjacent permanent magnets are opposite to each other.

19 Claims, 18 Drawing Sheets

(58) Field of Classification Search
USPC .. 310/12.01, 14, 12.21, 12.22, 12.24, 12.25, 310/12.26, 15, 23, 30, 37, 12
See application file for complete search history.

(56) References Cited

U.S. PATENT DOCUMENTS

| | | | |
|---|---|---|---|
| 6,025,659 | A | 2/2000 | Nashiki |
| 8,723,375 | B2 * | 5/2014 | Hiura .................. H02K 41/031 310/12.01 |
| 2005/0023905 | A1 | 2/2005 | Sakamoto |
| 2005/0082934 | A1 | 4/2005 | Kawai |
| 2011/0193425 | A1 | 8/2011 | Hiura et al. |
| 2011/0210686 | A1 * | 9/2011 | Sengchanh ............ H02K 1/146 318/135 |
| 2011/0221283 | A1 | 9/2011 | Kawakami |

FOREIGN PATENT DOCUMENTS

| | | | | |
|---|---|---|---|---|
| JP | 2001-298922 | | 10/2001 | |
| JP | 2002-79947 | | 3/2002 | |
| JP | 2005-51884 | | 2/2005 | |
| JP | 2005-198381 | | 7/2005 | |
| JP | 2010-114980 | | 5/2010 | |
| JP | WO 2010053031 A1 * | 5/2010 | ........... H02K 41/031 |
| WO | 2010/053031 | | 5/2010 | |
| WO | 2010/058500 | | 5/2010 | |

OTHER PUBLICATIONS

Japan Examiner's Decision of Refusal dated Apr. 7, 2015 corresponding to Japanese Application No. 2011-110519 (with partial English translation).

Office Action dated Jun. 4, 2015 in corresponding Chinese Application No. 201280021328.0 (with English translation of Search Report).

Extended European Search Report dated Mar. 18, 2016 in corresponding European Application No. 12785914.8.

Extended European Search Report dated Feb. 18, 2016 in corresponding European Application No. 12785914.8.

International Preliminary Report on Patentability and Written Opinion of the International Searching Authority dated Nov. 19, 2013 in International (PCT) Application No. PCT/JP2012/062480.

Decision to Grant a Patent issued in corresponding Japanese Application No. 2011-110519 dated Aug. 18, 2015 with partial English translation.

International Search Report dated Aug. 14, 2012 in International (PCT) Application No. PCT/JP2012/062480.

S. Shimomura, M. Fujieda, K. Hoshino, "Studies to Decrease Cogging Force and Pulsating Thrust in the Prototype Linear Permanent Magnet Vernier Motor", International Conference on Electrical Machines and Systems, 2008, pp. 3417-3422.

Y. Matsushima et al., "Analysis of Interior Permanent Magnet Type Linear Vernier Motor", The Institute of Electrical Engineers of Japan Kenkyukai Shiryo Linear Drive, Kenkyukai, May 27, 1999, vol. LD-99, No. 42-53, pp. 27-30 with concise explanation.

Y. Nakata et al., "Development of Electromagnetic Linear Actuator for Artificial Muscle", The Institute of Electrical Engineers of Japan Kenkyukai Shiryo, Linear Drive Kenkyukai, Oct. 30, 2008, vol. LD-08, No. 51-65, pp. 67-72 with concise explanation.

Yoshihiro Nakata et al., "Small Size Linear Vernier Motor for Artificial Muscle Applications", Nihon AEM Gakkaishi Mar. 2012, vol. 20, No. 1, pp. 113-118 with machine translation.

Office Action dated Feb. 23, 2017 in European Patent Application No. 12785914.8.

* cited by examiner

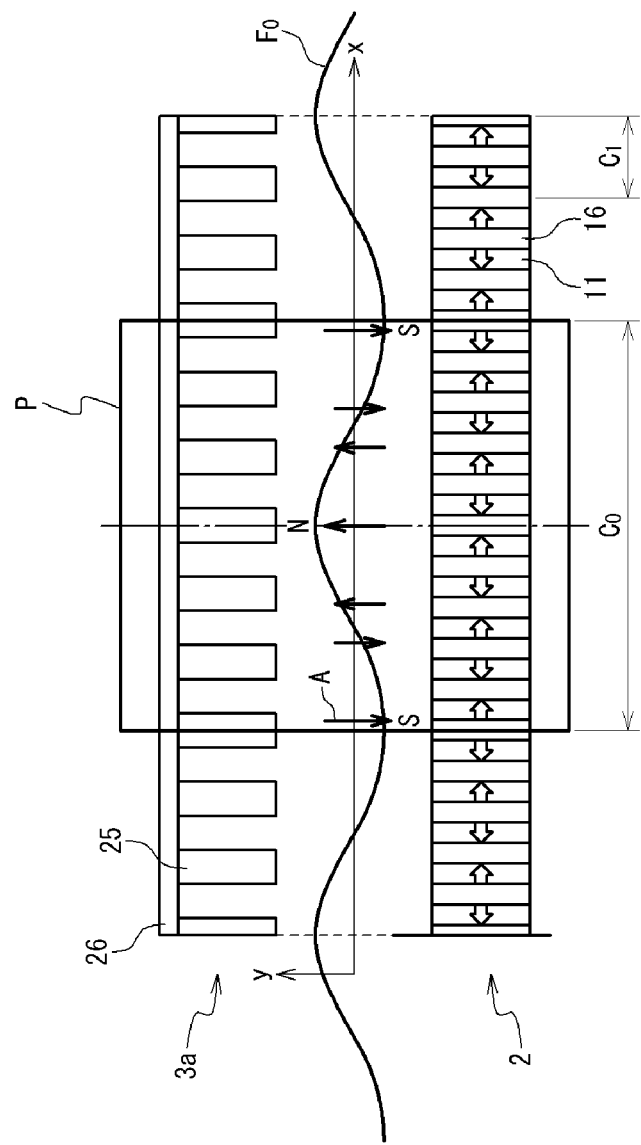

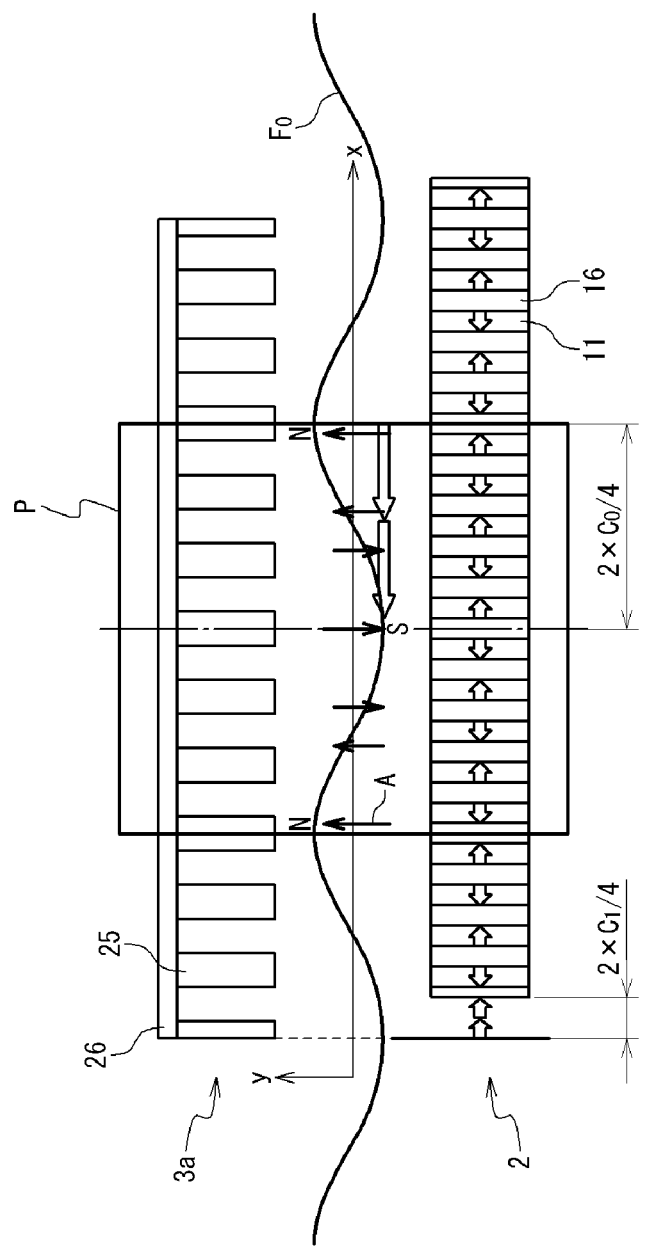

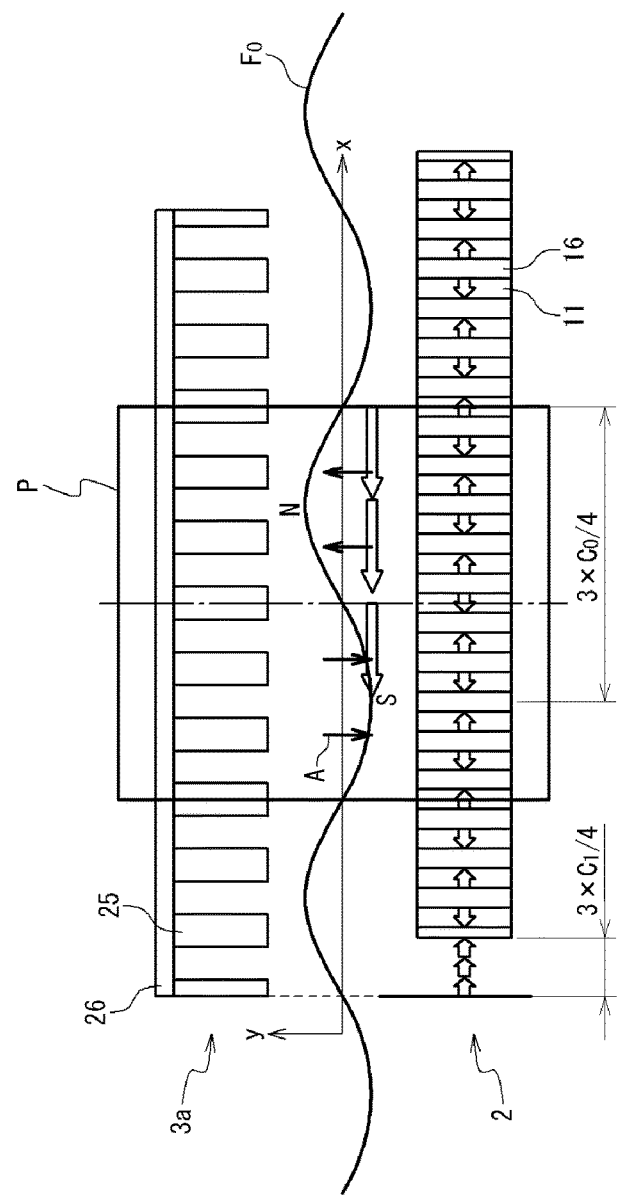

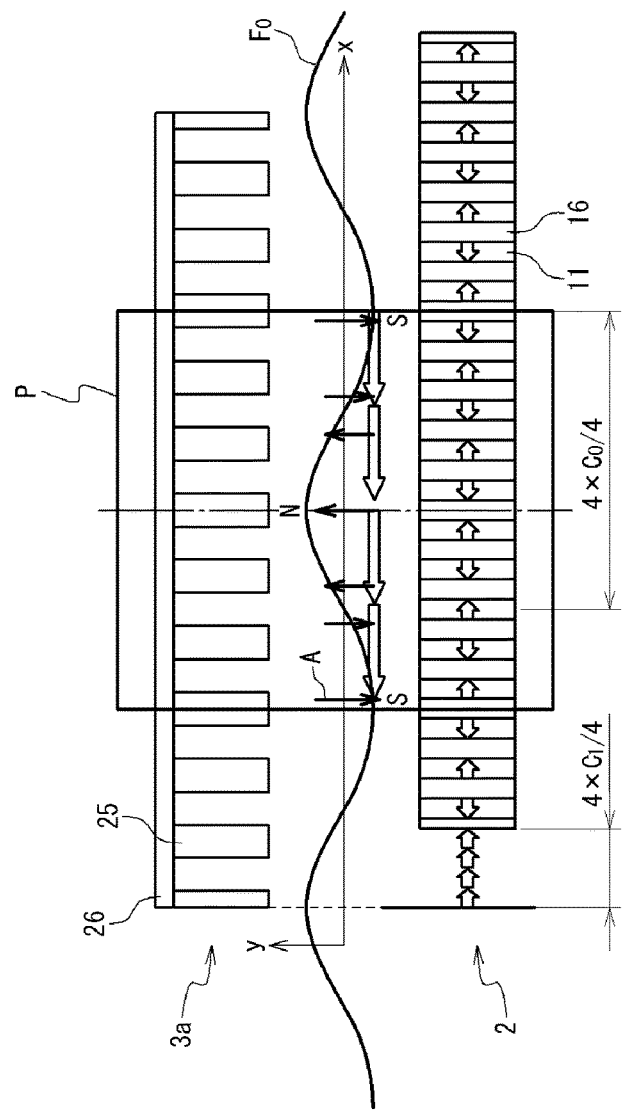

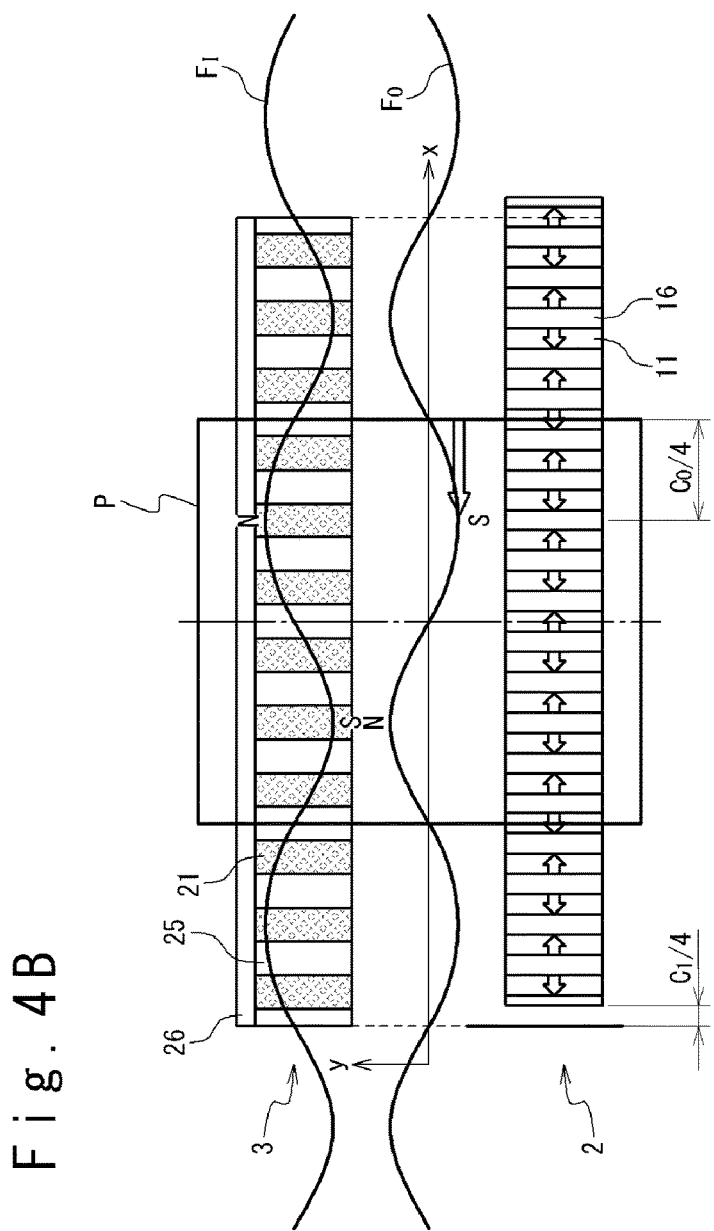

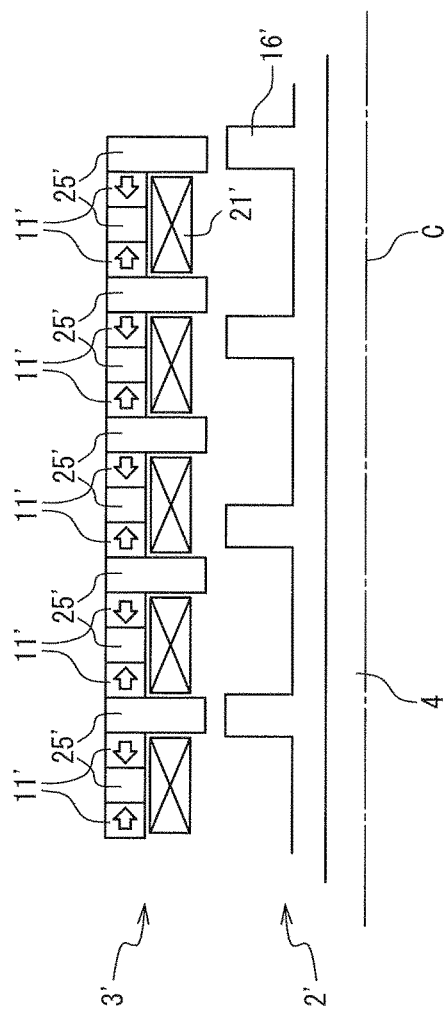

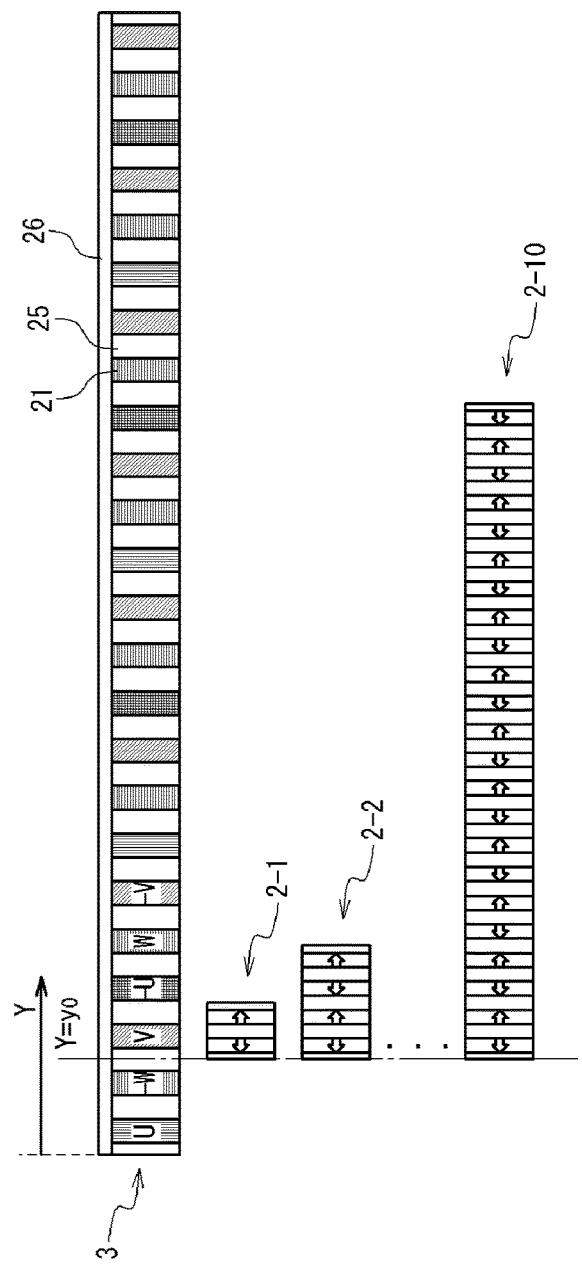

LINEAR VERNIER MOTOR

TECHNICAL FIELD

The present invention relates to a linear vernier motor.

BACKGROUND ART

A vernier-type linear motor has been proposed, in which a mover period and a stator period are different from each other to improve driving force (torque) of the linear motor. For example, a non-patent literature 1 discloses a PM-type linear vernier motor. This non-patent literature 1 proposes a technique which reduces pulsing force caused by cogging force and end effect occurring in the linear vernier motor.

Also, a patent literature 1 discloses an electric power steering apparatus using the linear vernier motor. This electric power steering apparatus includes: a pinion which is provided at a tip of a steering shaft and rotates with the steering shaft; a rack bar which engages with the pinion and makes a steering angle change by transforming rotary motion of the steering shaft into rectilinear motion of a longitudinal direction; a housing which houses the pinion and the rack bar; an electric motor which gives auxiliary power to the rack bar. The electric motor is a linear-type vernier motor characterized in the followings. In the housing, fixation slots, in which the number of the fixation slots is a first number in the longitudinal direction, are respectively provided away from each other by a first gap. In addition, movable slots, in which the number of the movable slots is a third number, are provided away from each other by a second gap within an addition length of whole fixation slots and the same number first gaps in the longitudinal direction of the rack bar, the third number being less than or more than the first number by a second number. Furthermore, permanent magnets are housed inside each of the fixation slots and each of the movable slots. Moreover, three phase AC coils, in which the second number is the number of magnetic pole pairs, are housed in one group of each of the fixation slots and each of the movable slots.

As a related technique, Japanese Patent Publication JP 2010-114980 A discloses a linear actuator. This linear actuator includes: a coil portion configured to include a plurality of coils respectively applied with AC currents having different phases from one another; and a shaft portion configured to pass through an inside of the plurality of coils. The shaft portion includes: a plurality of permanent magnets configured to be arranged along a central axis such that opposite magnetization directions face to each other in a direction of the central axis; and a plurality of intermediate members, each configured to be arranged between adjacent two of the plurality of permanent magnets. A saturation magnetic flux density of each of the plurality of intermediate members is higher than a saturation magnetic flux density of each of the plurality of permanent magnets. Or, the plurality of intermediate members includes permanent magnets which are arranged along the central axis such that magnetization directions are perpendicularly outward and perpendicularly inward with respect to the direction of the central axis alternately. Further, combining members may be arranged around each of the permanent magnets, the combining members having a saturation magnetic flux density higher than a saturation magnetic flux density of each of the plurality of permanent magnets. Each of the plurality of intermediate members may have a thickness in the central axis direction, the thickness increasing with increasing a distance from the central axis. In this linear actuator, driving force is improved by canceling magnetic flux saturation on the mover side.

CITATION LIST

Patent Literature

[PTL 1] JP 2002-79947A
[PTL 2] JP 2010-114980A

Non Patent Literature

[NPL 1] S. Shimomura, M. Fujieda, K. Hoshino, "Studies to decrease cogging force and pulsating thrust in the prototype linear permanent magnet Vernier motor", International Conference on Electrical Machines and Systems, 2008, pp. 3417-3422 (2008).

SUMMARY OF INVENTION

In the linear vernier motors of the above non-patent literature 1 and patent literature 1, the magnetization direction of the permanent magnet equipped into the mover (the inside) is perpendicular to the mover movable axis. In this structure, the fixation of the permanent magnet to the mover is difficult. Therefore, as shown in the figure of each literature, the volume of the permanent magnets in the mover becomes very small. As a result, there is a problem that the driving force to the own weight and volume of the motor is small.

Also, there is a problem, which is common to the vernier motor, that detent force (the force which occurs periodically in the moving direction of the mover regardless of the existence or non-existence of the motor driving; the cogging force and the end effect) occurs. To this problem, in the non-patent literature 1, it tries to cancel detent force by attaching additional permanent magnets in the stator side to be made to act on the permanent magnets at the mover side. However, in this method, the additional permanent magnets in the stator side do not contribute for the driving force at all, even though they have made the whole size, weight and cost greater.

An object of the present invention is to provide a linear vernier motor in which driving force can be more improved. Another object of the present invention is to provide a linear vernier motor which can make driving force to the own weight and volume of a motor great. Still another object of the present invention is to provide a linear vernier motor in which detent force can be reduced. Yet still another object of the present invention is to provide a linear vernier motor which can be easily assembled.

A linear vernier motor of the present invention includes a stator and a mover. The stator extends in a first direction. The mover extends in the first direction and a pole interval is different from that of the stator. At least one of the stator and the mover includes: a plurality of permanent magnets configured to be arranged in the first direction, and a plurality of yokes configured to be arranged in the first direction. Each of the plurality of yokes is arranged between adjacent permanent magnets. The plurality of permanent magnets is magnetized to the first direction and magnetization orientations of adjacent permanent magnets are opposite to each other.

In the above-mentioned linear vernier motor, the stator preferably includes: a plurality of first yokes configured to be arranged in the first direction, and a plurality of coils configured to be arranged in the first direction. Each of the plurality of first yokes is preferably arranged between adjacent coils. The plurality of first yokes and the plurality of coils preferably have a first periodic structure in which one period is composed of m units (m is an integer, equal to or more than two) of first yokes and m coils, and phases of the m coils are different from each other. The mover preferably includes: a plurality of second yokes as the plurality of yokes configured to be arranged in the first direction, and the plurality of permanent magnets configured to be arranged in the first direction. Each of the plurality of second yokes is preferably arranged between adjacent permanent magnets. The plurality of second yokes and the plurality of permanent magnets preferably have a second periodic structure in which one period is composed of n magnet pairs (n is an integer, equal to or more than one), each of the n magnet pairs including two units of second yokes and two permanent magnets. An one-period length in the axis direction of the first periodic structure and that of the second periodic structure are preferably equal to each other with n=m±1.

In the above-mentioned linear vernier motor, the stator preferably includes: a plurality of first yokes as the plurality of yokes configured to be arranged in the first direction, a plurality of coils configured to be arranged in the first direction, and the plurality of permanent magnets configured to be arranged in the first direction. Each of the plurality of first yokes is preferably arranged between adjacent coils and between adjacent permanent magnets. The plurality of first yokes and the plurality of coils preferably have a first periodic structure in which one period is composed of m units (m is an integer, equal to or more than two) of first yokes and m coils, and phases of the m coils are different from each other. The mover preferably includes: a plurality of second yokes configured to be arranged in the first direction. Each of the plurality of second yokes is preferably arranged at a predetermined interval. The plurality of second yokes preferably has a second periodic structure in which one period is composed of n second yokes (n is an integer, equal to or more than one). An one-period length in the axis direction of the first periodic structure and that of the second periodic structure is preferably equal to each other with n=m±1.

In the above-mentioned linear vernier motor, each of both edges of the mover is preferably a less than one unit of second yoke or a more than one and less than two units of second yokes. A length in a longitudinal direction of the mover is preferably set to one of a plurality of lengths in which detent force periodically occurring is relatively lowered.

In the above-mentioned linear vernier motor, the plurality of lengths is preferably set such that, when a center of a certain first yoke of the stator and a first end of a second yoke of one edge of the mover are adjusted while the certain first yoke and the second yoke of the one edge are arranged, a distance from a second end of a second yoke of the other edge of the mover to a coil of the stator nearest to the second end is an identical value in the plurality of lengths.

In the above-mentioned linear vernier motor, the number of the magnet pairs in the mover is preferably (j+k×n/2), here, the j is:

0<j<1, when both edges are a less than one unit of second yoke,

1<j<2, when both edges are a more than one and less than two units of second yokes, and the k is an integer, equal to or more than 0.

In the above-mentioned linear vernier motor, the mover preferably includes: the magnet pairs in which the number of the magnet pairs is integer, and the other magnet pair which is connected with the magnet pairs in which the number of the magnet pairs is integer, and in which the number of the other magnet pair is less than one.

In the above-mentioned linear vernier motor, in the mover, a thickness of at least one of the permanent magnet and the second yoke in the first direction at each of both edge portions is preferably different from that at a portion other than the both edge portions.

In the above-mentioned linear vernier motor, a thickness of each of the plurality of yokes in the first direction preferably is being increased from one of the stator and the mover where the each of the plurality of yokes is attached toward the other of the stator and the mover where the each of the plurality of yokes is not attached.

In the above-mentioned linear vernier motor, the stator preferably has a shape of a circular cylinder, and the mover preferably has a shape of a circular cylinder which is coaxial with the stator.

The above-mentioned linear vernier motor preferably further includes: a fixation shaft member configured to pass through the mover, be coaxial with the stator and the mover and be fixed with respect to the stator.

According to the present invention, in the linear vernier motor, the driving force can be more improved. Also, the driving force to the own weight and volume of the motor can be made great. In addition, the detent force can be reduced. Furthermore, the linear vernier motor can be easily assembled.

BRIEF DESCRIPTION OF DRAWINGS

FIG. 3A is a schematic diagram showing an operation principle of the linear vernier motor according to the first embodiment of the present invention;

FIG. 3C is a schematic diagram showing the operation principle of the linear vernier motor according to the first embodiment of the present invention;

FIG. 3D is a schematic diagram showing the operation principle of the linear vernier motor according to the first embodiment of the present invention;

FIG. 3E is a schematic diagram showing the operation principle of the linear vernier motor according to the first embodiment of the present invention;

FIG. 4B is a schematic diagram showing the method of operating the linear vernier motor according to the first embodiment of the present invention;

FIG. 6 is a schematic diagram showing a structure of a modified example of the linear vernier motor according to the first embodiment of the present invention;

FIG. 7 is a schematic diagram showing a structure of the mover and a positional relation between the mover and the stator;

DESCRIPTION OF EMBODIMENTS

Hereinafter, a linear vernier motor according to embodiments of the present invention will be described with reference to the attached drawings.

[First Embodiment]

Figure 1A:
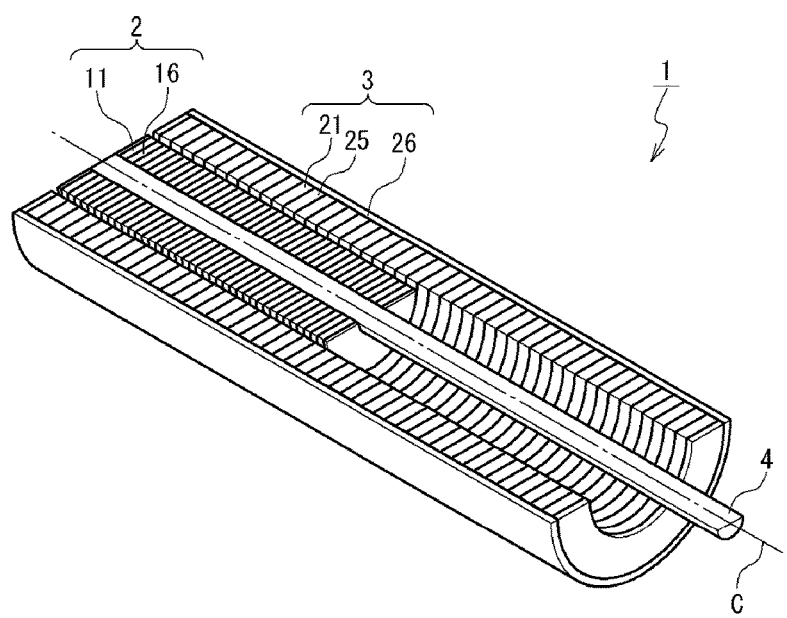
FIG. 1A is a schematic diagram showing an example of a structure of a linear vernier motor according to a first embodiment of the present invention.
Figure 1B:
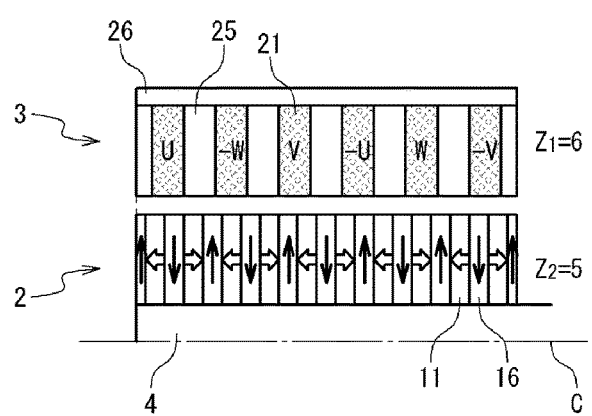
FIG. 1B is a schematic diagram showing a relation between a stator and a mover in FIG. 1A.

First, the structure of the linear vernier motor according to a first embodiment of the present invention will be described. FIG. 1A is a schematic diagram showing a configuration example of the linear vernier motor according to the first embodiment of the present invention. FIG. 1B is a schematic diagram showing a relation between stators and movers in FIG. 1A. However, FIG. 1A shows only a half of the linear vernier motor 1 for easy understanding. Also, FIG. 1B shows a periodic structure of a stator 3 and a mover 2 to be described later.

The linear vernier motor 1 is a linear-type vernier motor and is composed of the stator 3, the mover 2 and a fixation shaft member 4. The stator 3 has the shape of a circular cylinder which has an axis C as a central axis, and includes the mover 2 therein. The mover 2 has the shape of a circular cylinder which has the axis C as the central axis. The mover 2 is movable on the fixation shaft member 4 which passes through the inside of the mover 2. The fixation shaft member 4 is a shaft of a column shape which has the axis C as the central axis. The fixation shaft member 4 is fixed so as not to change a relative position to the stator 3. The fixation shaft member 4 is formed of non-magnetic material. The stator 3, the mover 2 and the fixation shaft member 4 are provided to be coaxial.

The stator 3 is composed of a plurality of first yokes 25, a plurality of coils 21 and a case 26. The first yoke 25 has a ring shape which is coaxial with the axis C, and is formed of soft magnetic material. The plurality of first yokes 25 is arranged at a predetermined interval along the axis C in the direction of the axis C. The coil 21 is provided between two adjacent first yokes 25. The case 26 has the shape of a circular cylinder which is coaxial with the axis C, and covers the outside of the plurality of first yokes 25. The case 26 is formed of soft magnetic material and is connected directly and magnetically to the plurality of first yokes 25. The plurality of first yokes 25 and the case 26 may be unified. The coil 21 has the ring shape which is coaxial with the axis C and is formed of conductive material. The plurality of coils 21 is arranged at a predetermined interval along the axis C in the direction of the axis C. The first yoke 25 is provided between two adjacent coils 21. The coil 21 and the first yoke 25 have close contact with each other.

The mover 2 is composed of a plurality of second yokes 16 and a plurality of permanent magnets 11. The permanent magnet 11 has the ring shape which is coaxial with the axis C. The plurality of permanent magnets 11 is arranged at a predetermined interval along the axis C in the direction of the axis C. The plurality of permanent magnets 11 are magnetized in the direction of the axis C. The orientations of the magnetizations of the two adjacent permanent magnets 11 are opposite to each other. That is, regarding the permanent magnet 11, its N pole faces to the N pole of one of the adjacent permanent magnets 11, and its S pole faces to the S pole of the other of the adjacent permanent magnets 11. The second yoke 16 is provided between the two adjacent permanent magnets 11. The second yoke 16 has the ring shape which is coaxial with the axis C and is formed of soft magnetic material. The plurality of second yokes 16 is arranged at a predetermined interval along the axis C in the direction of the axis C. The permanent magnet 11 is provided between the two adjacent second yokes 16. The second yoke 16 leads magnetic flux generated by the permanent magnet 11 to the outside in a perpendicular direction to the axis C or leads magnetic flux coming from the outside to the inside in a perpendicular direction to the axis C. The permanent magnet 11 and the second yoke 16 have close contact with each other.

In the stator 3, the plurality of first yokes 25 and the plurality of coils 21 have a first periodic structure in which one period has m units (m is an integer equal to or more than two) of first yokes 25 and m coils 21. That is, the first periodic structure can be regarded as being formed along the axis C in the direction of the axis C in the stator 3. At this time, the phases of AC currents (excitation currents) which flow through the m coils 21 are different from each other. The example of FIG. 1B shows m=6. In this case, the phases of the AC currents which flow through the coils are an U phase a −W phase, a V phase, a −U phase, a W phase, and a −V phase in order from one of ends. Therefore, one period of the first periodic structure includes six sets ($Z_1$=6) (here, in the case that one set is composed of one unit of first yoke 25 and one coil 21) of the first yoke 25 (a half), the U phase coil 21, the first yoke 25, the −W phase coil 21, the first yoke 25, the V phase coil 21, the first yoke 25, the −U phase coil 21, the first yoke 25, the W phase coil 21, the first yoke 25, the −V phase coil 21, and the first yoke 25 (a half). At this time, the first yoke 25 can be regarded as a pole of the stator 3 and $Z_1$ (=6) can be regarded as the number of poles of the stator 3.

On the other hand, in the mover 2, the plurality of second yokes 16 and the plurality of permanent magnets 11 have magnet pairs, each of which is composed of two units of second yokes 16 of the two permanent magnets 11. That is, in the mover 2, the plurality of magnet pairs can be regarded as being arranged along the axis C in the direction of the axis C. Moreover, the plurality of second yokes 16 and the plurality of permanent magnets 11 have a second periodic structure in which one period has n magnet pairs (n is an integer equal to or more than one). That is, the second periodic structure can be regarded as being formed along the axis C in the direction of the axis C in the mover 2. The example of FIG. 1B shows n=5. Therefore, in the magnet pair which is composed of the second yoke 16 (a half), the permanent magnet 11, the second yoke 16, the permanent magnet 11, the second yoke 16 (a half), the second periodic structure includes five magnet pairs ($Z_2=5$). At this time, the second yoke 16 can be regarded as a pole of the mover 2 and $Z_2$ (=5) can be regarded as the number of poles of the mover 2.

Here, the first periodic structure and the second periodic structure are equal to each other in the length of one period in the direction of the axis C. That is, the length of one period from the first yoke 25 (half) in one end of the first periodic structure to the first yoke 25 (half) in the other end of the first periodic structure is equal to the length of one period from the second yoke 16 (half) in one end of the second periodic structure to the second yoke 16 (half) in the other end of the second periodic structure. Also, a relation between m and n is n =m±1. Since it has such a relation, the function as the vernier motor can be achieved. The example of FIG. 1B shows m=6 ($Z_1=6$), n=5 ($Z_2=5$) and n=m−1. That is, it is possible to regard as the period (one period corresponding to six poles) of the poles (the first yokes 25) of the stator 3 being different from the period (one period corresponding to five poles) of the poles (the second yokes 16) of the mover 2. In other words, the interval between the poles (the first yokes 25) of the stator 3 and the interval between the poles (the second yokes 16) of the mover 2 are different.

Also, since it is not a rotation motor, there is no specific limitation in the length of the mover 2 in the longitudinal direction (which is parallel to the axis C). For example, from the viewpoint of the easiness of the control, it is desirable that the length is the (positive) integral multiple of the length of one period of the second periodic structure. In the same way, there is no specific limitation in the length of the stator 3 in the longitudinal direction (which is parallel to the axis C). For example, from the viewpoint of the easiness of the control, it is desirable that the length is the (positive) integral multiple of the length of one period of the first periodic structure.

It should be noted that when the AC currents flowing through the coils 21 are of three-phase AC, it is desirable that the value of m is 6 (in the above-mentioned example) or 3 from the viewpoint of control easiness. Also, when the AC currents flowing through the coils 21 are of single-phase AC, it is desirable that the value of m is 2 from the viewpoint of control easiness.

Also, soft magnetic material of the first yoke 25 and the second yoke 16 is exemplified by pure iron (electromagnetic soft iron and so on), permalloy, and silicon steel. The first yoke 25 and the second yoke 16 may be formed of same material and may be formed of different material.

Figure 2A:
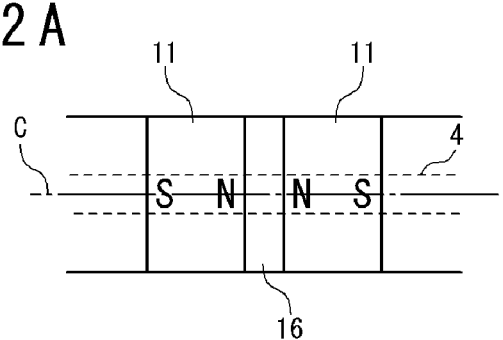
FIG. 2A is an outline cross sectional view showing an example of a specific structure of a second yoke.

Here, the second yoke 16 of the mover 2 will be more described. FIG. 2A to FIG. 2D are cross sectional views schematically showing examples of specific structures of the second yoke 16. In these cases, the second yoke 16 put between the two N poles will be described, however the same description is applied to the second yoke 16 put between the two S poles. The second yoke 16 shown in FIG. 2A is the second yoke 16 shown in FIG. 1A and FIG. 1B.

Figure 2B:
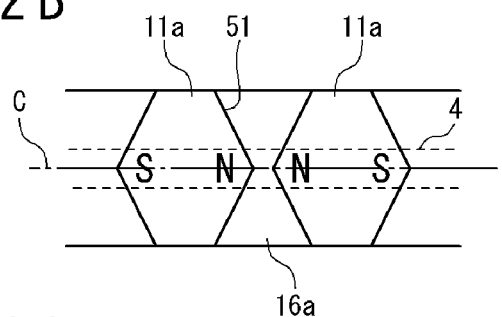
FIG. 2B is an outline cross sectional view showing an example of a specific structure of the second yoke.
Figure 2C:
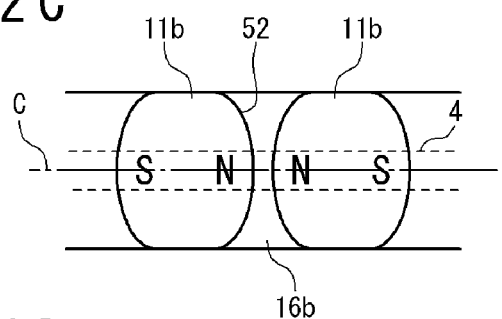
FIG. 2C is an outline cross sectional view showing an example of a specific structure of the second yoke.
Figure 2D:
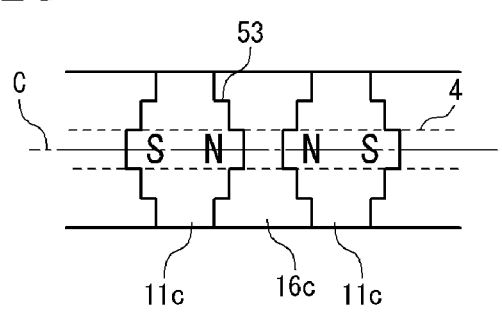
FIG. 2D is an outline cross sectional view showing an example of a specific structure of the second yoke.

On the other hand, in the second yokes 16a to 16c shown in FIG. 2B to FIG. 2D, the thickness in the direction of the axis C is being increased from the mover 2 where the second yoke itself is attached toward the stator 3 where the second yoke itself is not attached. These are individually described below.

The thickness of the second yoke 16a shown in FIG. 2B in the direction of the axis C becomes thicker with distance from the axis C. That is, the second yoke 16a has concave portions 51, each of which has a reverse conical shape with the axis C as a center, on two surfaces contacting the permanent magnets 11a. At this time, the permanent magnet 11a has convex portions, each of which has a conical shape with the axis C as a center, on the ends. In this case, magnetic flux lines can pass from the end of the N pole of the permanent magnet 11 to an external direction almost perpendicular to the axis C through the second yoke 16a with a large saturation magnetic flux density. Since the thickness in the direction of the axis C increases with distance from the axis C at this time, the centering of the magnetic flux in the periphery of the second yoke 16a can be prevented and the occurring of the magnetic saturation can be prevented. That is, the magnetic flux in the direction perpendicular to the axis C in the position of the stator 3 can be increased while the magnetic field leads to the outside through the second yoke 16a to prevent the magnetic saturation caused by centering of the magnetic flux. As a result, thrust force of the linear vernier motor 1 can be more increased. This is the same as the end of the S pole of the permanent magnet 11 although the direction of the magnetic flux lines are opposite. In addition, repulsion force between the adjacent permanent magnets 11 can be made weak by putting the second yoke 16a between them and the assembling of the mover 2 can be facilitated. Thus, the manufacturing of the linear vernier motor 1 can be facilitated. Also, since the permanent magnets 11 as expensive material decrease in the motor 1, the costs of the linear vernier motor 1 can be reduced.

Moreover, the second yokes 16b and 16c shown in FIG. 2C and FIG. 2D are basically the same as the second yoke 16a (the thickness in the direction of the axis C increases with distance from the axis C). However, the shapes of concave portions 52 and 53 having a center on the axis C are different from the concave portion 51 of the second yoke 16a. That is, the second yoke 16b shown in FIG. 2C has the shape (the shape like a concave lens) with the concave portions 52, each of which a cross section is formed of a curve. At this time, the permanent magnet 11b has the shape (the shape like a convex lens) with the convex portions, each of which a cross section is formed of a curve. Also, the second yoke 16c shown in FIG. 2D has the shape with the concave portions 53, each of which a cross section is formed of a plurality of steps. At this time, the permanent magnet 11c has the shape with the convex portions, each of which a cross section is formed of a plurality of steps. The same effect as in the shape shown in FIG. 2B can be attained in the both shapes.

Next, the operation of the linear vernier motor according to the first embodiment of the present invention will be described. FIG. 3A to FIG. 3E are schematic diagrams showing the operation principle of the linear vernier motor according to the first embodiment of the present invention. Here, a relation between a position of the mover 2 and a magnetic flux density distribution when the mover 2 is forced to move with respect to the stator 3a which does not use any coil 21 will be described. However, the stator 3a is composed of the first yokes 25 and the case 26 (there is not any coil 21) and the mover 2 is composed of the second yokes 16 and the permanent magnets 11. An area P (a length C0) shows one period of the first periodic structure ($Z_1=6$) of the stator 3$a$ and one period of the second periodic structure ($Z_2=5$) of the mover 2. It is supposed that a length of one unit of magnetic pole pair in the mover 2 is one pitch (a length C1). A curve F0 shows the magnetic flux density distribution in the y direction by the mover 2. The x-axis shows a position in the direction of the axis C in the mover 2 and the stator 3$a$ and the y-axis shows a magnetic flux density. The positive side of the y-axis above the x-axis shows the magnetic flus as the N pole and the negative side of the y-axis below the x-axis shows the magnetic flus as the S pole. Each arrow schematically shows the direction and size of the magnetic flux density in the y direction at the position.

FIG. 3A shows an initial state. The second yoke 16 is put between the S poles of the permanent magnets 11 in the mover 2 in front of the first yoke 25 of the stator 3$a$ at each of the boundary in the −x direction and the boundary in the +x direction in the area P. Therefore, the magnetic flux in the −y direction from the first yoke 25 toward the second yoke 16 is generated (corresponding to the S pole). At this time, since both correctly face to each other, the magnetic flux density becomes the maximum. Also, the second yoke 16 is put between the N poles of the permanent magnets 11 of the mover 2 in front of the first yoke 25 of the stator 3$a$ at the center in the x direction. Therefore, the magnetic flux in the +y direction from the second yoke 16 toward the first yoke 25 is generated (corresponding to the N pole). At this time, since both correctly face to each other, the magnetic flux density becomes the maximum. That is, the curve F0 is a periodic curve that takes a negative maximum value at each of the boundary in the −x direction and the boundary in the +x direction and takes a positive maximum value at the center in the x direction.

Figure 3B:
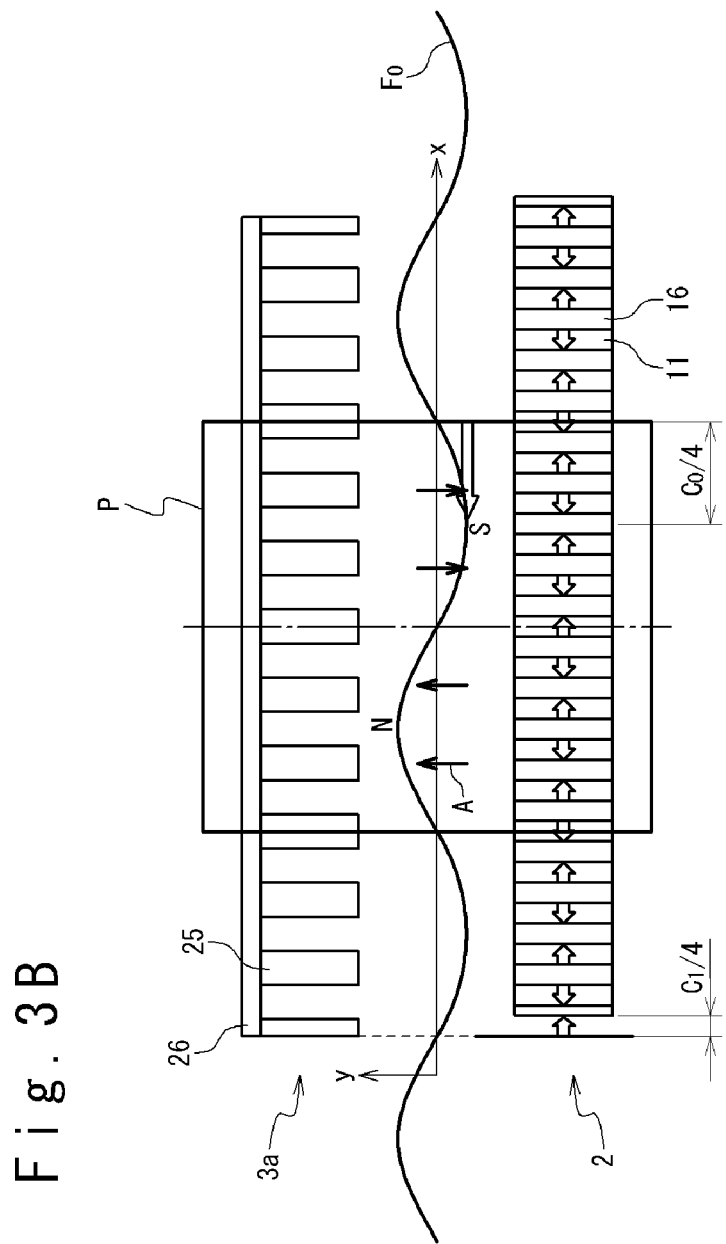
FIG. 3B is a schematic diagram showing the operation principle of the linear vernier motor according to the first embodiment of the present invention.

FIG. 3B shows a state that the mover 2 is shifted to the +x direction by 1/4 pitch=C1/4. The permanent magnet 11 of the mover 2 exists in front of the first yoke 25 of the stator 3$a$ at each of the boundary in the −x direction, the center of the x direction, and the boundary in the +x direction in the area P. Therefore, the magnetic flux between the first yoke 25 and the permanent magnet 11 becomes remarkably small. The magnetic flux density becomes the minimum (substantially zero). The second yoke 16 put between the N poles of the permanent magnets 11 of the mover 2 exists in the slightly shifted position from the first yoke 25 of the stator 3$a$ in a position away from the boundary in the −x direction toward the +x direction by 3/4 pitch=3/4×C1 or (1+3/4) pitch=(1+3/4)×C1. Therefore, the magnetic flux in the +y direction from the second yoke 16 toward the first yoke 25 is generated. At this time, the magnetic flux density becomes a middle degree because both face to each other while being slightly shifted to each other. The second yoke 16 put between the S poles of the permanent magnets 11 of the mover 2 exists in the slightly shifted position from the first yoke 25 of the stator 3$a$ in a position away from the boundary in the +x direction toward the −x direction by 3/4pitch=3/4×C1 or (1+3/4) pitch=(1+3/4)×C1. Therefore, the magnetic flux in the −y direction from the first yoke 25 toward the second yoke 16 is generated. At this time, the magnetic flux density becomes a middle degree because both face to each other while being slightly shifted. That is, the curve F0 is a periodic curve which takes positive and negative maximum values in positions shifted from the boundary in the −x direction and the boundary in the +x direction, respectively, by the (1+1/4) pitch=(1+1/4)×C1.

Therefore, it is found that when the mover 2 is shifted to the +x direction by 1/4pitch=C1/4, the curve F0, i.e. the magnetic flux density distribution is shifted to the −x direction by C0/4 (a quarter period). Here, because of C0=5×C1, a movement quantity (C1/4) of the mover 2 is amplified five times to move the magnetic flux density distribution.

FIG. 3C shows a state in which the mover 2 is shifted to the +x direction further by 1/4pitch =C1/4 (2/4pitches=2× C1/4 in total). The second yoke 16 put between the N poles of the permanent magnets 11 of the mover 2 exists in front of the first yoke 25 of the stator 3$a$ at each of the boundary in the −x direction and the boundary in the +x direction in the area P. Therefore, the magnetic flux in the +y direction from the second yoke 16 toward the first yoke 25 is generated. At this time, since both correctly face to each other, the magnetic flux density becomes the maximum. Also, the second yoke 16 put between the S poles of the permanent magnets 11 of the mover 2 exists in front of the first yoke 25 of the stator 3$a$ at the center in the x direction. Therefore, the magnetic flux in the −y direction from the first yoke 25 toward the second yoke 16 is generated. At this time, since both correctly face to each other, the magnetic flux density becomes the maximum. That is, the curve F0 is a periodic curve which takes a positive maximum value at each of the boundary in the −x direction and the boundary in the +x direction and takes a negative maximum value at the center in the x direction. Therefore, it is found that when the mover 2 is further shifted to the +x direction by 1/4pitch=C1/4, the curve F0, i.e. the magnetic flux density distribution is further shifted to the −x direction by C0/4 (a quarter period; 5 times the movement quantity (C1/4) of the mover 2). From the initial state, the mover 2 is moved to the +x direction by 2/4 pitch=2×C1/4 and the magnetic flux density distribution is shifted to the −x direction by 2×C0/4 (2/4periods).

The FIG. 3D shows a state that the mover 2 is shifted to the +x direction further by 1/4pitch =C1/4 (3/4pitches=3× C1/4 in total). The permanent magnet 11 of the mover 2 exists in front of the first yoke 25 of the stator 3$a$ at each of the boundary in the +x direction, the center of the x direction and the boundary of the +x direction in the area P. Therefore, the magnetic flux between the first yoke 25 and the permanent magnet 11 becomes remarkably small. The magnetic flux density becomes the minimum (substantially zero). Also, the second yoke 16 put between the S poles of the permanent magnets 11 of the mover 2 exists in the slightly shifted position from the first yoke 25 of the stator 3$a$ in a position away from the boundary in the −x direction toward the +x direction by 3/4 pitch=3/4×C1 or the (1+3/4) pitch= (1+3/4)×C1. Therefore, the magnetic flux in the −y direction from the first yoke 25 toward the second yoke 16 is generated. At this time, the magnetic flux density becomes a middle degree because both face to each other while being slightly shifted to each other. The second yoke 16 put between the N poles of the permanent magnets 11 of the mover 2 exists in the slightly shifted position from the first yoke 25 of the stator 3$a$ in a position away from the boundary in the +x direction toward the −x direction by 3/4pitch=3/4×C1 or (1+3/4) pitch=(1+3/4)×C1. Therefore, the magnetic flux in the +y direction from the second yoke 16 toward the first yoke 25 is generated. At that time, the magnetic flux density becomes a middle degree because both face to each other while being slightly shifted. That is, the curve F0 is a periodic curve which takes negative and positive maximum values in positions shifted from the boundary in −x direction and the boundary in the +x direction, respectively, by the (1+1/4) pitch=(1+1/4)×C1.

Therefore, it is found that when the mover 2 is shifted further to the +x direction by 1/4pitch=C1/4, the curve F0, i.e. the magnetic flux density distribution is shifted further to the −x direction by C0/4 (a quarter period; 5 times the movement quantity (C1/4) of the mover 2). From the initial state, the mover 2 is moved to the +x direction by 3/4pitch=3×C1/4 and the magnetic flux density distribution is shifted to the −x direction by 3×C0/4 (3/4periods).

FIG. 3E shows a state in which the mover 2 is shifted to the +x direction further by 1/4pitch =C1/4 (4/4pitches=4× C1/4 in total). The second yoke 16 put between the S poles of the permanent magnets 11 of the mover 2 exists in front of the first yoke 25 of the stator 3a at each of the boundary in the −x direction and the boundary in the +x direction in the area P. Therefore, the magnetic flux in the −y direction from the first yoke 25 toward the second yoke 16 is generated. At this time, since both correctly face to each other, the magnetic flux density becomes the maximum. Also, the second yoke 16 put between the S poles of the permanent magnets 11 of the mover 2 exists in front of the first yoke 25 of the stator 3a at the center in the x direction. Therefore, the magnetic flux in the +y direction from the second yoke 16 toward the first yoke 25 is generated. At this time, since both correctly face to each other, the magnetic flux density becomes the maximum. That is, the curve F0 is a periodic curve which takes a negative maximum value at each of the boundary in the −x direction and the boundary in the +x direction and takes a positive maximum value at the center in the x direction. Therefore, it is found that when the mover 2 is further shifted to the +x direction by 1/4pitch=C1/4, the curve F0, i.e. the magnetic flux density distribution is further shifted to the −x direction by C0/4 (a quarter period; 5 times the movement quantity (C1/4) of the mover 2). From the initial state, the mover 2 is moved to the +x direction by 4/4pitch=4×C1/4 and the magnetic flux density distribution is shifted to the −x direction by 4×C0/4 (4/4periods). The same applies hereafter.

In this way, it is found that, when the mover 2 is forced to move with respect to the stator 3a which does not use any coil 21, based on the relative positional relation between the stator 3a and the mover 2, the magnetic flux density distribution (the curve F0) is moved. Conversely, it is possible to say that, if the magnetic flux density distribution is forced to move, the relative positional relation between the stator 3a and the mover 2 can be made to change. The moving of the magnetic flux density distribution can be attained by continuously arranging a plurality of coils whose phases are different from each other along the C axis in the first yokes 25 and generating a moving magnetic field (a magnetic flux density distribution) which continuously move toward the +x direction or the −x direction. The structure is the liner vernier motor 1 according to the present embodiment shown in FIG. 1A and FIG. 1B.

Figure 4A:
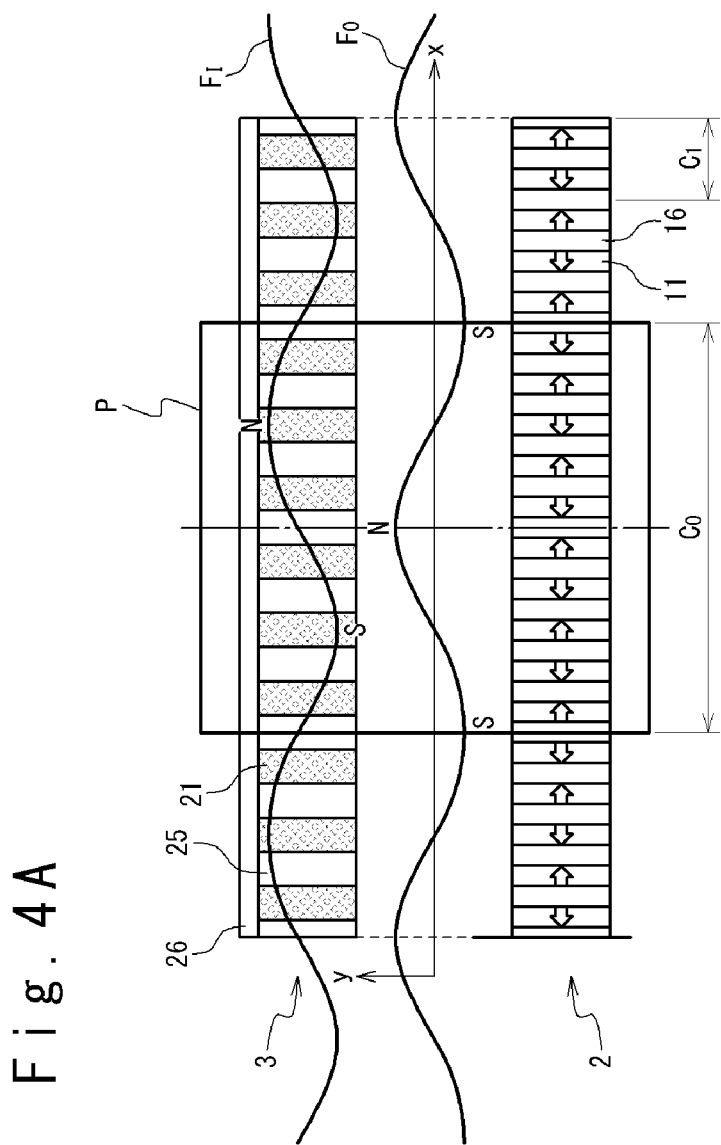
FIG. 4A is a schematic diagram showing a method of operating the linear vernier motor according to the first embodiment of the present invention.

Next, a method of operating the linear vernier motor according to the first embodiment of the present invention will be described. FIG. 4A to FIG. 4B are schematic diagrams showing the method of operating the linear vernier motor according to the first embodiment of the present invention. Here, the description will be made for the relation among the magnetic flux density distribution of the moving magnetic field, the position of the mover 2 and the magnetic flux density distribution of the mover 2, when the moving magnetic field is generated by exciting the coils 21 of the stator 3 using the currents to move the mover 2. However, as previously described, the stator 3 is composed of the coils 21, the first yokes 25 and the case 26, and the mover 2 is composed of the second yokes 16 and the permanent magnets 11. A curve FI shows the magnetic flux density distribution of the moving magnetic field of the stator 3. The area P (the length C0), the one pitch (the length C1) of the magnet pair, the curve F0, the y-axis and the x-axis are the same as those of FIG. 3A to FIG. 3E.

FIG. 4A show a state that the mover 2 is the same as that in FIG. 3A. In this case, the positional relation between the mover 2 and the second yoke 16 and the magnetic flux density distribution (the curve F0) by the mover 2 are the same as those in the case of FIG. 3A. That is, the curve F0 is the periodic curve which takes a negative maximum value (corresponding to the S pole) at each of the boundary of the −x direction and the boundary of the +x direction and takes a positive maximum value (corresponding to the N pole) at the center of the x direction, in the area P. In this state, a case is considered that the stator 3 using the coils 21 is excited by the currents to generate the moving magnetic field at certain time. It is supposed that the magnetic flux density distribution (the curve FI) of the moving magnetic field is the following. That is, when focusing on the area P, the magnetic flux density distribution (the curve FI) is the periodic curve which takes a minimum value (substantially zero) at the boundary of the −x direction, the center in the x direction and the boundary of the +x direction and takes a negative maximum value and a positive maximum value (corresponding to the S pole and the N pole respectively) at positions away from the boundary of the −x direction and the boundary of the +x direction by C0/4 (=(1+1/4 )×C1), respectively.

In this case, between the magnetic flux density distribution (the curve F0) by the mover and the magnetic flux density distribution (the curve FI) by the stator 3, the position in the x direction of the N pole of one of them and the position in the x direction of the S pole of the other of them are different. For example, the position in the x direction of the N pole by the mover 2 and the position in the x direction of the S pole by the stator 3 are different. In this case, the attractive force acts between the N pole and the S pole and they are pulled to each other. That is, they try to move to a stable point (a stable position) where the magnetic potential is the minimum. At this time, the stator 3 is fixed and the mover 2 is movable. Therefore, the mover 2 moves such that the position in the x direction of the N pole by the mover 2 and the position in the x direction of the S pole by the stator 3 overlap with each other. In the example of this figure, the mover 2 moves such that the curve F0 is shifted to the −x direction and the position with the maximum value (corresponding to the N pole) of the +y of the curve F0 and the position with the maximum value (corresponding to the S pole) of the −y of the curve FI overlap with each other. FIG. 4B shows that state.

FIG. 4B shows the state that the mover 2 is the same as that FIG. 3B. Therefore, it is found that, when the magnetic flux density distribution shown by the curve FI of FIG. 4A (and FIG. 4B) is given, the magnetic flux density distribution shown by the curve F0 moves according to the moving magnetic field, that is, the mover 2 moves. In the example of this figure, the mover 2 moves to the +x direction by 1/4pitch=C1/4. In the same way, it is possible to carry out the further movement to the +x direction and the movement to the −x direction by the movement of the magnetic flux density distribution (the curve F0) using the magnetic flux density distribution (the curve FI).

The movement of the mover 2, i.e. the magnetic flux density distribution (the curve F0) toward a desired spot can be controlled by controlling how much the magnetic flux density distribution shown by the curve FI is made to move to the +x direction or the −x direction. The movement of the magnetic flux density distribution shown by the curve FI can be attained by controlling the plurality of coils 21. That is, a position sensor (not illustrated) is installed in the mover 2. Then, based on the position detected by the position sensor and the position of the desired spot, the magnetic flux density distribution (the curve FI) by the plurality of coils 21 is controlled. As for the control of the plurality of coils 21, the conventional techniques can be used.

As described above, it is possible to operate the linear vernier motor according to the present embodiment.

Incidentally, in above-mentioned example, the case of n=m−1 (5=6−1) is described. In this case, the movement direction of the magnetic flux density distribution (the curve F0) and the movement direction of the mover 2 are opposite. However, note that, in the case of n=m+1, the movement direction of the magnetic flux density distribution (the curve F0) and the movement direction of the mover 2 are the same. In this case, if the movement direction of the movement magnetic field by the stator 3 is controlled in the direction contrary to above-mentioned example, it is possible to operate the linear vernier motor in the same way.

At this embodiment, in the mover, the permanent magnets are arranged such that their magnetization directions turn to the axis direction. Then, to prevent the adjacent permanent magnets from weakening each other's magnetic fields, the second yoke is provided between the adjacent permanent magnets to lead the magnetic field to the outside (the N pole magnetic field) or the inside (the S pole magnetic field). As a result, the volume of the permanent magnet in the mover can be made great. Also, in the positions of the coil and the first yoke of the stator, the magnetic flux per unit volume or unit weight on the mover side in the direction perpendicular to the axis, which contributes for the driving force, can be increased. Accordingly, it is possible to increase the ratio of driving force to own weight. Also, since the linear vernier motor can be manufactured unifying the permanent magnets in a large unit, the assembling can be easily carried out in high precision. Therefore, in addition to achieving cost reduction, the gap between the mover and the stator can be made smaller which leads to improvement of the driving force.

Figure 5A:
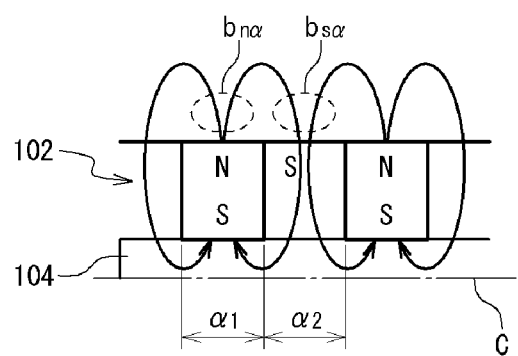
FIG. 5A is a schematic cross sectional view of a mover according to the patent literature 1.
Figure 5B:
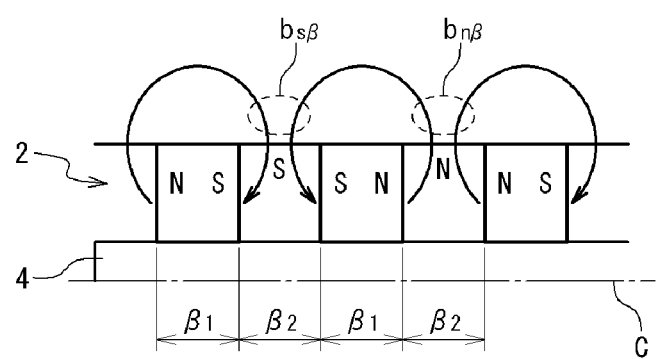
FIG. 5B is a schematic cross sectional view of the mover according to the present embodiment.

The linear vernier motor according to the present embodiment further has the following effects. FIG. 5A and FIG. 5B are schematic cross sectional views of the mover describing the effects. Here, FIG. 5A shows the case of the patent literature 1 and FIG. 5B shows the case of the present embodiment.

With reference to FIG. 5A, in the patent literature 1, a permanent magnet which has magnetization in a direction perpendicular to an axis C is embedded in the mover. In this structure, the magnetic flux density $b_{N\alpha}$ (corresponding to the width α1 of the magnetic flux) of the N pole (the N pole of the permanent magnet) in the mover surface and the magnetic flux density $b_{S\alpha}$ (corresponding to the width α2 of the magnetic flux) of the S pole (the S pole appearing at the yoke between the permanent magnets) need to be equal ($b_{N\alpha}=b_{S\alpha}$). Therefore, shape parameters are determined like that a ratio (α1/α2) of the permanent magnet width to the yoke width becomes a fixed value, and thus design flexibility to maximize a driving force is low.

On the other hand, with reference to FIG. 5B, in the present embodiment, the mover including the permanent magnets is used, the permanent magnets each having magnetization in the direction parallel to the axis C and being arranged in the direction of the axis C through the yoke. Therefore, the N pole (the N pole appearing at the yoke between the permanent magnets) and the S pole (the S pole appearing at the yoke between the permanent magnets) have the same structure even though their polarities are different. Therefore, even if the permanent magnet width (β1) is changed, regardless of the magnitude of the change, it is very easy to make the yoke width (β2) of the N pole and the yoke width (β2) of the S pole be the same width. That is, it is very easy to make the N pole magnetic flux density $b_{N\beta}$ and the S pole magnetic flux density $b_{S\beta}$ equal ($b_{N\beta}=b_{S\beta}$). Accordingly, there is high flexibility for a ratio (β1/β2) of the permanent magnet width to the yoke width. As a result, the linear vernier motor 1 of the present embodiment, as compared with the case of FIG. 5A, the design flexibility to maximize the driving force is remarkably high. In addition, as described later, the design flexibility to suppress the detent force is also high.

The linear vernier motor 1 (FIG. 1A to FIG. 1B) of the above embodiment is provided with the mover inside and the stator outside, respectively. However, the present invention is not limited to this example. That is, it may be provided with the mover outside and the stator inside, respectively.

The linear vernier motor 1 (FIG. 1A to FIG. 1B) of the above embodiment is provided with the permanent magnet in the mover. However, the present invention is not limited to this example. That is, it may be provided with the permanent magnet in the stator instead of the mover. For example, as shown in FIG. 6, it may be provided with only the second yoke 16' (made to have unevenness structure in the cross section) in the mover 2' and the permanent magnet 11' outside the coil 21' of the stator 3'. The permanent magnet 11' has magnetization in the direction parallel to the axis C and is arranged through the first yoke 25' in the direction of the axis C.

In this case, for example, the first yoke 25' may have the structure in which the thickness in the direction of the axis C is being increased from the stator where the first yoke 25' itself is attached toward the mover 2 where itself is not attached. Accordingly, the effects which are the same as those obtained in FIG. 2B to FIG. 2D can be obtained.

As described above, in the linear vernier motor according to the present embodiment, the driving force can be further improved. Also, the driving force to the own weight and volume of the motor can be made great. In addition, the design flexibility can be improved. Furthermore, the linear vernier motor can be easily assembled.

[Second Embodiment]

Next, a structure of the linear vernier motor according to the second embodiment of the present invention will be described. The present embodiment is different from the first embodiment in the point that, mainly, the length of the mover 2 is changed in order to reduce the cogging force. As previously described, since the linear vernier motor is not a rotary motor, the length of the mover can be freely changed and the flexibility of the design is high even at this point. In the present embodiment, the point different from the first embodiment will be mainly described.

The result of the consideration that the inventor carried out about the relation between the detent force and the number of the permanent magnets of the mover will be described. FIG. 7 is a schematic diagram showing the structure of the mover and position relation between the mover and the stator. The stator 3 is the same as the case (FIG. 1A and FIG. 1B) of the first embodiment. It is supposed that the reference point (Y=y0) of the Y axis is the position which is away from the left end of this figure by two units (half unit+one unit+half unit) of the first yokes 25 and the two coils 21 (U phase+−W phase). The Y axis is set in the direction to which the stator 3 is extended. The mover 2 is basically the same as the case (FIG. 1A and FIG. 1B) of the first embodiment. However, it is different from the first embodiment in the length in the longitudinal direction (Y direction in FIG. 7). Here, a plurality of movers 2-0.5, 2-1, 2-2, . . . , 2-10, . . . , 2-11.5 is used, whose lengths in the longitudinal direction are different. In this regard, the value of "q" of the mover 2-$q$ shows the number of the magnetic pairs. For example, the mover 2-0.5 shows that the magnetic pair is 0.5 pair. The mover 2-1 shows that the magnetic pair is one pair. Here, the 0.5 pair is the case that the mover includes a single permanent magnet whose magnetization direction is one of the −Y direction and the +Y direction. FIG. 7 shows, as examples, the mover 2-1, the mover 2-2 and the mover 2-10. In this consideration, in each case of the plurality of the movers 2-0.5 to 2-11.5, each of the plurality of the movers 2-0.5 to 2-11.5 is attached to the stator 3 such that the position of the left edge corresponds to the position of Y=y0 (the reference point) of the stator 3. For example, it is supposed that the length of the coil 21 in the direction of the C axis is 2 mm and the length of the first yoke 25 is 2 mm, y0=8 mm. In each case, the relation between the first periodic structure and the second periodic structure shown in the first embodiment is the same ($Z_1$=6/$Z_2$=5).

Figure 8:
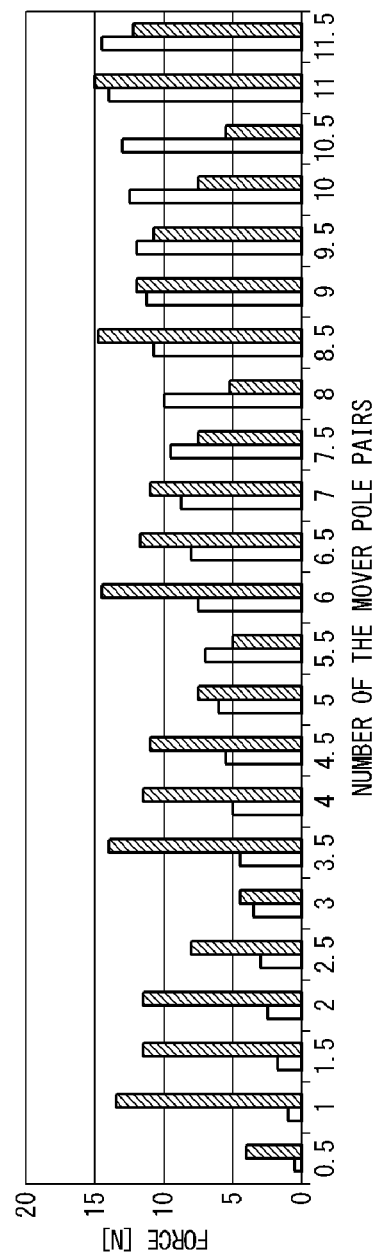
FIG. 8 is a graph showing a relation between detent force and driving force and the number of the magnet pairs of the mover.

The detent force and the driving force in each case of the plurality of mover 2-0.5 to 2-11.5 of FIG. 7 were measured. FIG. 8 shows the result. FIG. 8 is a graph showing the relation between the detent force and the driving force and the number of the magnet pairs of the mover. The vertical axis shows the detent force (N) and the driving force (N), and the horizontal axis shows the number of the magnet pairs. The bar with diagonal lines shows the detent force and the bar with white color shows the driving force. As shown in this figure, it is found that the driving force (the bar with white color) increases monotonously with increase of the number of the magnet pairs. However, as shown in this figure, the detent force (the bar with the diagonal lines) changes periodically correspondingly to the number of the magnet pairs. In this case, as for the detent force, it is found that there is a periodic change every 2.5 pairs. In other words, the detent force changes at the period of the (j+2.5 k) pairs. Here, j=0.5, 1, 1.5, 2, 2.5 and k=0, 1, 2, 3, . . . . Then, it is found that there is the number of the magnet pairs that the detent force becomes small. In the plurality of the movers of FIG. 7, the magnet pairs are 0.5 pairs (the mover 2-0.5), 3 pairs (the mover 2-3), 5.5 pairs (the mover 2-5.5), 8 pairs (the mover 2-8), 10.5 pairs (the mover 2-10.5). That is, they are the cases of j 0.5.

Figure 9:
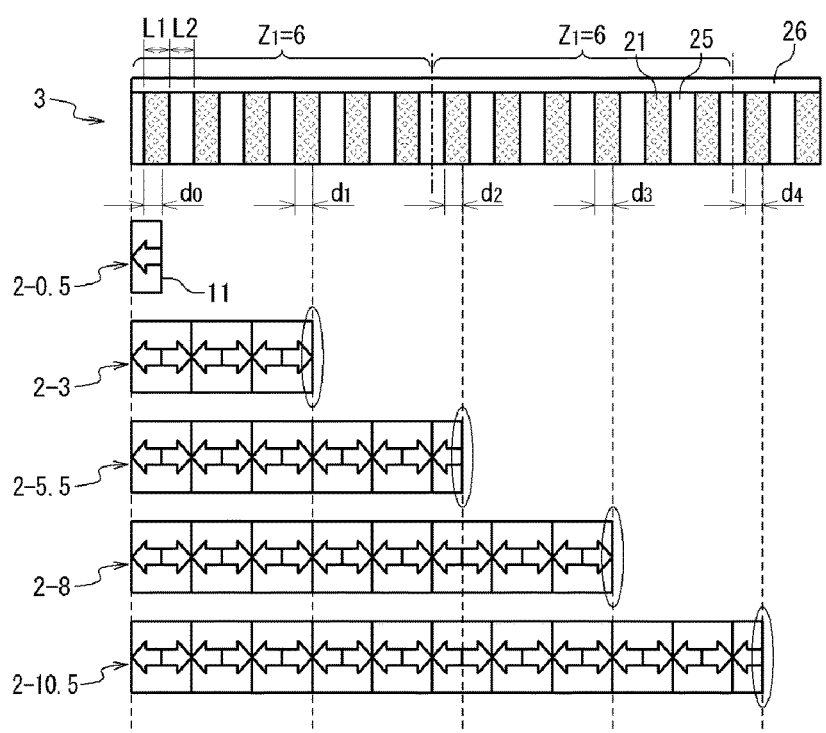
FIG. 9 is a schematic diagram showing a relation between a structure of the mover and a structure of the stator.

Based on the result of the above FIG. 7 and FIG. 8, the length of the magnet pairs of the mover 2 is considered. FIG. 9 shows the result. FIG. 9 is a schematic diagram showing relation between the structure of the mover and the structure of the stator. Here, the second yokes in the mover 2 are omitted (hereinafter, similarly to FIG. 10A). It is supposed that the length of the coil 21 of the stator 3 is L1=2 mm and the length of the first yoke 25 is L2=2 mm. It is assumed that the left end of the stator 3 in this figure is the reference point and the movers 2-0.5, 2-3, 2-5.5, 2-8, 2-10.5 (j+2.5 k; j=0.5, k=0, 1, 2, 3, 4) with the small detent force are arranged such that their left ends are adjusted to the left end (the center of the first yoke 25) of the stator 3. Then, their right ends of the movers 2-0.5, 2-3, 2-5.5, 2-8, 2-10.5 with the small detent force are away from the left ends of the nearest coil 21$s$ by d0=d1=d2=d3=d4=+1.4 mm, respectively. That is, it is found that the relative positional relations between the coils 21 and the ends of the movers 2 are the same, regardless of the value of k. In addition, it is found that, in each of j=1, 1.5, 2, 2.5, the relative positions between the coils 21 and the ends of the movers 2 are the same, regardless of the value of k, which is not shown here. Accordingly, it is found that the detent force is generated mainly by attractive forces between the magnetic poles of the both edges of the mover and the magnetic poles of the stator (the edge effect) and is hardly changed even if the mover is lengthened. Incidentally, it is considered that "2.5" in this equation is the half of the number ($Z_2$=5) of the magnet pairs which is one period of the second periodic structure. Therefore, it is possible to regard the expression as (j+k×n/2). The value "j" is determined using an experiment or simulation based on the dimensions, the magnetic properties and so on of the second yoke 16, the permanent magnet 11, the first yoke 25 and the coil 21 of the mover 2 and the stator 3. For example, in the case that the both edges of the mover 2 are the second yokes 16 each of which is less than one unit, the j becomes 0<j<1. In this example, since the both edges of the mover 2 are the second yokes 16 each of which is 0.5 unit, the j becomes j=0.5. On the other hand, the both edges of the mover 2 are the second yokes 16 each of which is more than one and less than two units, the j becomes 1<j<2.

In the case of the second periodic structure of 7 (7=6+1), similarly, it is considered to be (j+k×n/2)=j+3.5 k. Here, in this case, the j is j=0.5, 1, 1.5, 2, 2.5, 3, 3.5 while k =0, 1, 2, 3, . . . . The optimal value of the j is the value which is similarly determined using an experiment or using simulation based on the dimensions, the magnetic properties and so on of the second yoke, the permanent magnet, the first yoke and the coil of the mover and the stator. For example, in the case that the both edges of the mover are the second yokes each of which is less than one unit, the j becomes 0<j<1. On the other hand, the both edges of the mover are the second yokes each of which is more than one and less than two units, the j becomes 1<j<2.

In the movers 2-0.5, 2-3, 2-5.5, 2-8, 2-10.5, . . . with the detent force is small, the numbers of the magnet pairs are 0.5, 3, 5.5, 8, 10.5, . . . . It is possible to regard the numbers of the magnetic pairs as being different from the integral multiple of the number of the magnet pairs n=5 of one period of the second periodic structure.

Also, it is possible to regard the right edge as being in the center neighborhood of the nearest coil 21 when the left edge of each of the movers 2-0.5, 2-3, 2-5.5, 2-8, 2-10.5 with the small detent force is in the center of the first yoke 25. By applying this fact to the mover 2, a method can be considered in which the right edge of the mover 2 is placed in the center neighborhood of the nearest coil 21 when the left edge of the mover 2 is centered in the first yoke 25. For example, as shown in the figure, it is possible to regard the mover 2-10.5 as adding a magnet pair of ½ pair to the edge of the mover 2-10 to make the right edge be in the center neighborhood of the nearest coil 21 when the left edge is centered in the first yoke 25. Or, changing a view point, it is possible to regard the mover 2-10.5 as removing a magnet pair of ½ pair from the edge of the mover 2-11 (the magnet pairs are 11 pairs) to make the right edge be in the center neighborhood of the nearest coil 21.

In this way, in the present embodiment, by providing the mover 2 as the movers 2-0.5, 2-3, 2-5.5, 2-8, 2-10.5, . . . (j+2.5 k; j=0.5, k=0, 1, 2, 3, 4, . . . ) and appropriately setting the relative positional relation between the edges of the mover 2 and the coil 21 of the stator 3, the detent force can be reduced. For example, as compared with the method of reducing the detent force by attaching additional permanent magnets to the stator side disclosed in the non-patent literature 1, it can be said that this method is a remarkable effective method in that the detent force can be reduced with hardly changing the size, weight and cost as a whole and hardly affecting the driving force remarkably. That is, the detent force can be reduced while whole permanent magnets occupying a large part of the cost is made to contribute to the driving force. As a result, the detent force can be reduced only by slightly adding or deleting the permanent magnet pair to or from the mover 2 and the stator 3 which were designed based on the requirements with the size, weight and cost and so on. At this point, it is understood that the flexibility of the linear vernier motor 1 of the present embodiment is high.

Figure 10A:
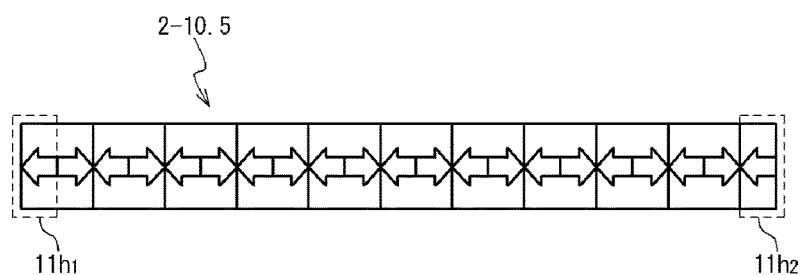
FIG. 10A is a schematic diagram showing the mover of a magnet pair 10.5.
Figure 10B:
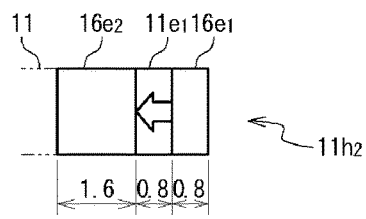
FIG. 10B is a schematic diagram showing a both edge structure of the mover.
Figure 10C:
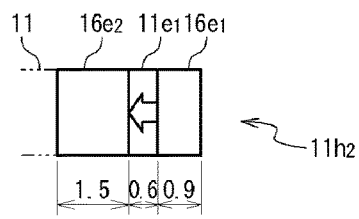
FIG. 10C is a schematic diagram showing the both edge structure of the mover.

Moreover, to further reduce the detent force, the following optimization was carried out on the both edge structures of the mover 2-10.5. FIG. 10A is a schematic diagram showing the mover 2-10.5. FIG. 10B to FIG. 10C are schematic diagrams showing the both edge structures of the mover 2-10.5. Here, as shown in FIG. 10A, in the mover 2-10.5 (the number of the magnet pairs is 10.5 pairs), the dimensions in the longitudinal direction of the permanent magnet 11 and the second yoke 16 in the both edges 11$h$1, 11$h$2 are optimized. However, the edge 11$h$1 and the edge 11$h$2 are the same structure, the edge 11$h$2 will be described below.

FIG. 10B shows a state before the optimization of the edge 11$h$2. The edge 11$h$2 is composed of the second yoke 16$e$1, the permanent magnet 11$e$1 and the second yoke 16$e$2 and these are connected in this order from the end. The second yoke 16$e$2 is further connected with the permanent magnet 11. The second yoke 16$e$2 has the same size (the size of one unit) as the other second yoke 16 (which is not shown), and it is 1.6 mm in the example of this figure. The permanent magnet 11$e$1 has the same size (the size of one unit) as the other permanent magnet 11 (which is not shown) and it is 0.8 mm in the example of this figure. Since the second yoke 16$e$1 is arranged at the end, the second yoke 16$e$1 has the size (the size less than one unit) of the half of the other second yoke 16 (which is not shown) and it is 0.8 mm in the example of this figure. It should be noted that, in this case, the length in the direction of the axis C of the magnet pair is (1.6+0.8)×2=4.8 mm, and the length 24 mm of the five period thereof becomes equal to the length 24 mm ((2+2)×6) of the six period of the first yoke 25 and the coil 21.

In this way, it is possible for the mover 2 to have the length which periodically appears and in which the detent force is relatively small as previously mentioned by applying the second yoke 16 whose size is less than one unit to the both edges of the mover 2. Also, even though it is not shown here, it is possible for the mover 2 to have the length which periodically appears and in which the detent force is relatively small by applying the second yoke 16 whose size is more than one and less than two units to the both edges of the mover 2, similarly.

FIG. 10C shows a state after the optimization of the edge 11$h$2. In the edge 11$h$2, the second yoke 16$e$2 was made thin a little (the size of less than one unit was made thin further). In the example of this figure, the thickness of 1.6 mm was made thin to the thickness of 1.5 mm. It is possible to regard this as changing the position of the permanent magnet 11$e$1. Also, the second yoke 16$e$1 was made thick a little (the size of one unit was made big further). In the example of this figure, the thickness of 0.8 mm was made thick to the thickness of 0.9 mm. Moreover, the permanent magnet 11$e$1 was made thin a little. In the example of this figure, the thickness of 0.8 mm was made thin to the thickness of 0.6 mm. It is possible to regard these as changing the magnetic flux density from the permanent magnet 11$e$1. The similar optimization was carried out on the edge 11$h$1. In this case, it is not shown here, but the reduction of the detent force was confirmed. In this way, in the mover 2, by changing the widths of the permanent magnet 11 and the second yoke 16 and the position of the permanent magnet 11 especially in the edge, the magnetic flux density distribution in the edge is changed, thereby enabling the detent force to be reduced.

In this way, the detent force can be further reduced by adjusting the edge structure of the mover 2 as the less than one unit of the second yoke 16 of each of the both edges. Also, it is not shown here, the detent force can be further reduced similarly by adjusting the edge structure of the mover 2 as the more than one and less than two units of the second yoke 16 of each of the both edges.

Figure 11A:
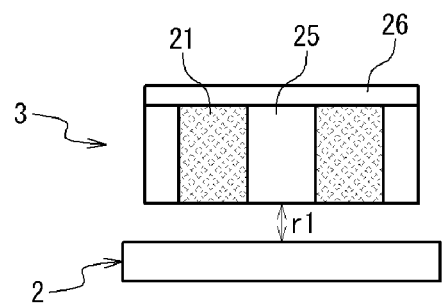
FIG. 11A is a schematic diagram showing a relation between the stator and the mover.
Figure 11B:
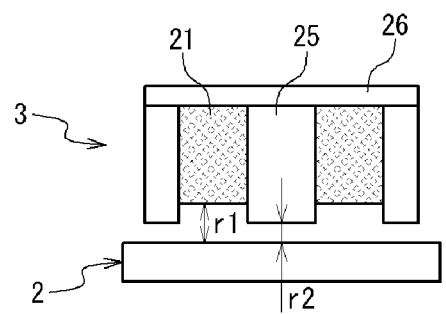
FIG. 11B is a schematic diagram showing a relation between the stator and the mover.

Moreover, to improve the driving force, the following optimization was carried out on the structure of the stator 3. FIG. 11A to FIG. 11B are schematic diagrams showing relation between the stator 3 and the mover 2. Here, FIG. 11A to FIG. 11B show a part of the stator 3, however, other parts are the same. FIG. 11A shows a state before the optimization of the stator 3. As shown in FIG. 11A, the air gap between the stator 3 and the mover 2 is the same in any position of the first yoke 25 and coil 21. It is supposed that the size of the air gap is r1 (exemplification: 0.8 mm). On the other hand, FIG. 11B shows a state after the optimization of the stator 3. As shown in FIG. 11B, in the air gap between the stator 3 and the mover 2, the size at the coil 21 is the r1 without any change, however, the size at the first yoke 25 is changed and is made smaller to be r2 (exemplification: 0.3 mm). As described above, by reducing the air gap between the first yoke 25 and the mover 2, the driving force can be improved.

Figure 12A:
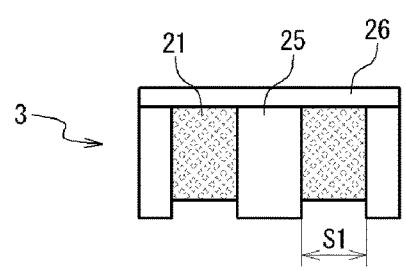
FIG. 12A is a schematic diagram showing a structure of the stator.
Figure 12B:
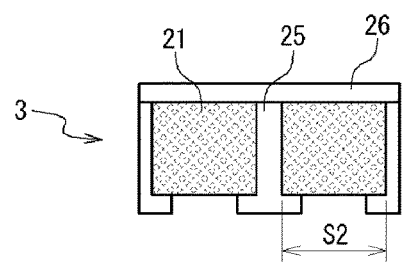
FIG. 12B is a schematic diagram showing the structure of the stator.

Moreover, to further improve the driving force, the following optimization was carried out on the structure of the stator 3. FIG. 12A to FIG. 12B are schematic diagrams showing the structure of the stator 3. Here, FIG. 12A to FIG. 12B show a part of the stator 3, however, other parts are the same. FIG. 12A shows a state before the optimization of the stator 3 (It is the same as FIG. 11B). As shown in FIG. 12A, each of the first yoke 25 and the coil 21 of the stator 3 has the shape which stands up perpendicularly from the case 26. At that time, it is supposed that the width of the coil 21 is s1 (exemplification: 2.0 mm). On the other hand, FIG. 12B shows a state after the optimization of the stator 3. As shown in FIG. 12B, the width of the coil 21 of the stator 3 is enlarged to be s2 (exemplification: 3.4 mm) such that a part of the coil 21 goes inside the first yoke 25 (the width of the first yoke 25 at the part decreases). That is, the shape of the first yoke 25 is changed such that the volume of the coil 21 can be increased. The magnitude of the movement magnetic field which is generated in the stator 3 can be made great further and the driving force can be improved.

Figure 13A:
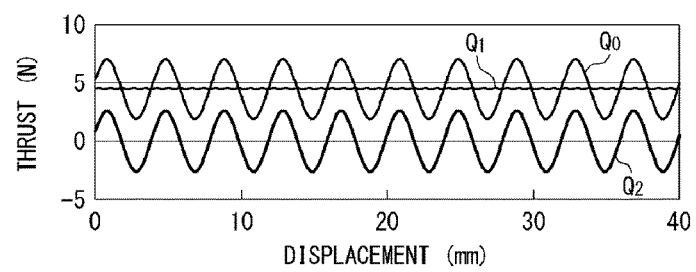
FIG. 13A is a graph showing a relation between driving force and a position on the stator.
Figure 13B:
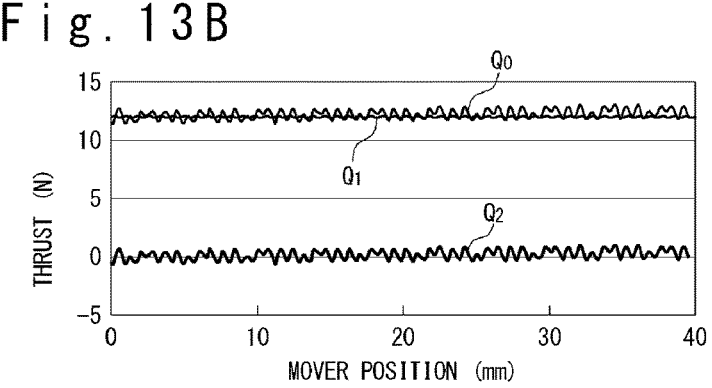
FIG. 13B is a graph showing a relation between the driving force and the position on the stator.

The result of carrying out the above optimizations will be described below. FIG. 13A and FIG. 13B are graphs showing relation between driving force (thrust) and the position on the stator 3. In both cases, the vertical axis shows the driving force (N) and the horizontal axis shows the position (mm) in the longitudinal direction on the stator 3. Also, the Q2 shows the detent force, the Q1 shows the electromagnetic force and the Q0 shows the force which merged them together. FIG. 13A shows a state before the optimization of the mover and the stator. In this case, the detent force (Q2) occurs periodically in the longitudinal direction of the stator 3 and the maximum value is about 2.5 N. Also, the electromagnetic force (Q1) is about 4 N. Therefore, the whole driving force (Q0) which merged them together is periodically changed around about 4 N as a central value depending on the position. It is considered that even in such a state, it is usable for some applications.

On the other hand, FIG. 13B shows a state after carrying out all optimizations of FIG. 9, FIG. 10C, FIG. 11B add FIG. 12B. In this case, the detent force (Q2) occurs periodically but a maximum value is reduced to about 0.6 N. Also, the electromagnetic force (Q1) is increased to about 12.3 N. Therefore, the whole driving force (Q0) which merged them together is less periodically changed around about 12.3 N as the central value depending on the position. That is, it is possible to generate the higher and more stable driving force. If it is not necessary to improve the driving force, it is considered that it is good to carry out only at least one of the cases of FIG. 9 and FIG. 10C which can reduce the detent force. Also, if it is not necessary to reduce the detent force, it is considered that it is good to carry out only at least one of the cases of FIG. 11B and FIG. 12B which can improve the driving force.

In this way, by carrying out the optimizations of the mover and the stator, the detent force can be greatly eased while the driving force per own weight and volume of the motor is increased.

It should be noted that, in each of the above embodiments, the descriptions are made using the examples that the stator 3 and the mover 2 have the circular cylinder shape and the stator 3 is arranged outside. However, the present invention is not limited to these examples. For example, the stator 3 may be arranged inside, the stator 3 and the mover 2 may be a tube-like shape which has a polygonal cross section, or the stator 3 and the mover 2 may be a flat-plate type.

It is apparent that the present invention is not limited to the above embodiments, but may be modified and changed without departing from the scope and spirit of the invention.

This application is based upon and claims the benefit of priority from Japanese patent application No. 2011-110519 filed on May 17, 2011, the disclosure of which is incorporated herein in its entirety by reference.

The invention claimed is:

1. A linear vernier motor comprising:
a stator configured to extend along a direction of an axis in a first direction; and
a mover configured to extend along the axis in the first direction, wherein a pole interval of the mover is different from that of the stator,
wherein one of the stator and the mover includes:
a plurality of first yokes arranged in the first direction; and
a plurality of coils arranged in the first direction,
wherein each of the plurality of first yokes is arranged between adjacent coils,
wherein the plurality of first yokes and the plurality of coils have a first periodic structure in which one period is composed of m units, where m is an integer equal to or more than two, of first yokes and m coils, and phases of the m coils are different from each other,
wherein the other one of the stator and the mover includes:
a plurality of second yokes arranged in the first direction; and
a plurality of permanent magnets arranged in the first direction,
wherein each of the plurality of second yokes is arranged between adjacent permanent magnets,
wherein the plurality of magnets are magnetized along the first direction and magnetization orientations of adjacent permanent magnets are opposite to each other,
wherein each of the plurality of coils is wound around the axis,
wherein the plurality of second yokes and the plurality of permanent magnets have a second periodic structure in which one period is composed of n magnet pairs, where n is an integer equal to or more than one, each of the n magnet pairs including two units of second yokes and two permanent magnets, and
wherein an one-period length in the axis direction of the first periodic structure and that of the second periodic structure are equal to each other with $n=m\pm 1$.

2. The linear vernier motor according to claim 1, wherein the plurality of coils are provided for the stator and the plurality of permanent magnets are provided for the mover,
wherein each of both edges of the mover is a less than one unit of second yoke or a more than one and less than two units of second yoke, and
wherein a length in a longitudinal direction of the mover is set to one of a plurality of lengths predetermined based on the number of magnet pairs.

3. The linear vernier motor according to claim 2, wherein the plurality of lengths is set such that, when a center of a certain first yoke of the stator and a first end of a second yoke of one edge of the mover are adjusted while the certain first yoke and the second yoke of the one edge are arranged, a distance from a second end of a second yoke of the other edge of the mover to a coil of the stator nearest to the second end is an identical value in the plurality of lengths.

4. The linear vernier motor according to claim 3, wherein the number of the magnet pairs in the mover is $(j+k\times n/2)$, here, the j is:
$0<j<1$, when both edges are a less than one unit of second yoke,
$1<j<2$, when both edges are a more than one and less than two units of second yokes, and
the k is an integer equal to or more than 0.

5. The linear vernier motor according to claim 3, wherein the mover includes:
the magnet pairs in which the number of the magnet pairs is integer, and
the other magnet pair which is connected with the magnet pairs in which the number of the magnet pairs is an integer, and in which the number of the other magnet pair is less than one.

6. The linear vernier motor according to claim 3, wherein, in the mover, a thickness of at least one of the permanent magnet and the second yoke in the first direction at each of both edge portions is different from that at a portion other than the both edge portions.

7. The linear vernier motor according to claim 2, wherein the number of the magnet pairs in the mover is $(j+k\times n/2)$, here, the j is:
$0<j<1$, when both edges are a less than one unit of second yoke,
$1<j<2$, when both edges are a more than one and less than two units of second yokes, and
the k is an integer equal to or more than 0.

8. The linear vernier motor according to claim 7, wherein the mover includes:
the magnet pairs in which the number of the magnet pairs is integer, and
the other magnet pair which is connected with the magnet pairs in which the number of the magnet pairs is integer, and in which the number of the other magnet pair is less than one.

9. The linear vernier motor according to claim 7, wherein, in the mover, a thickness of at least one of the permanent magnet and the second yoke in the first direction at each of both edge portions is different from that at a portion other than the both edge portions.

10. The linear vernier motor according to claim 2, wherein the mover includes:
   the magnet pairs in which the number of the magnet pairs is integer, and
   the other magnet pair which is connected with the magnet pairs in which the number of the magnet pairs is integer, and in which the number of the other magnet pair is less than one.

11. The linear vernier motor according to claim 10, wherein, in the mover, a thickness of at least one of the permanent magnet and the second yoke in the first direction at each of both edge portions is different from that at a portion other than the both edge portions.

12. The linear vernier motor according to claim 2, wherein, in the mover, a thickness of at least one of the permanent magnet and the second yoke in the first direction at each of both edge portions is different from that at a portion other than the both edge portions.

13. The linear vernier motor according to claim 1, wherein a thickness of each of the plurality of first yokes or the plurality of second yokes in the first direction increases from the one of the stator and the mover where the each of the plurality of first yokes or the plurality of second yokes is attached toward the other of the stator and the mover where the each of the plurality of yokes is not attached.

14. The linear vernier motor according to claim 1, wherein the stator has a shape of a circular cylinder, and
   wherein the mover has a shape of a circular cylinder which is coaxial with the stator.

15. The linear vernier motor according to claim 1, further comprising:
   a fixation shaft member configured to pass through the mover, be coaxial with the stator and the mover and be fixed with respect to the stator.

16. A linear vernier motor comprising:
   a stator configured to extend along a direction of an axis in a first direction; and
   a mover configured to extend along the axis in the first direction, wherein a pole interval of the mover is different from that of the stator,
   wherein one of the stator and the mover includes:
      a plurality of permanent magnets arranged in the first direction;
      a plurality of coils arranged in the first direction; and
      a plurality of first yokes arranged in the first direction,
   wherein each of the plurality of first yokes is arranged between adjacent permanent magnets,
   wherein the plurality of permanent magnets are magnetized along the first direction and magnetization orientations of adjacent permanent magnets are opposite to each other,
   wherein each of the plurality of first yokes is arranged between adjacent coils and between adjacent permanent magnets,
   wherein each of the plurality of coils is wound around the axis,
   wherein the plurality of first yokes, the plurality of permanent magnets, and the plurality of coils have a first periodic structure in which one period is composed of m units, where m is an integer equal to or more than two, of first yokes, m magnet pairs and m coils, and phases of the m coils are different from each other,
   wherein the other one of the stator and the mover includes:
      a plurality of second yokes arranged in the first direction,
   wherein each of the plurality of second yokes is arranged at a predetermined interval,
   wherein the plurality of second yokes has a second periodic structure in which one period is composed of n second yokes, where n is an integer equal to or more than one, and
   wherein an one-period length in the axis direction of the first periodic structure and that of the second periodic structure are equal to each other with $n=m\pm 1$.

17. The linear vernier motor according to claim 16, wherein a thickness of each of the plurality of yokes in the first direction increases from one of the stator and the mover where the each of the plurality of yokes is attached toward the other of the stator and the mover where the each of the plurality of yokes is not attached.

18. The linear vernier motor according to claim 16, wherein the stator has a shape of a circular cylinder, and
   wherein the mover has a shape of a circular cylinder which is coaxial with the stator.

19. The linear vernier motor according to claim 16, further comprising:
   a fixation shaft member configured to pass through the mover, be coaxial with the stator and the mover and be fixed with respect to the stator.

* * * * *